(12) United States Patent
Bian et al.

(10) Patent No.: US 8,581,999 B2
(45) Date of Patent: Nov. 12, 2013

(54) METHOD OF AUTOMATICALLY PERFORMING PET EYE CORRECTION

(75) Inventors: Qiaoling Bian, Hangzhou (CN); Chen Shi, Hangzhou (CN); Zhenyu Yang, Hangzhou (CN); Junxiang Zhang, Hangzhou (CN)

(73) Assignee: ArcSoft Hangzhou Co., Ltd., Hangzhou, Zhejuang Province ( * ) Notice: Subject to any disclaimer, the term of this patent is extended or adjusted under 35 U.S.C. 154(b) by 391 days.

(21) Appl. No.: 12/980,290

(22) Filed: Dec. 28, 2010

(65) Prior Publication Data

US 2012/0162458 A1   Jun. 28, 2012

(51) Int. Cl.
*H04N 9/73* (2006.01)
*G06K 9/00* (2006.01)

(52) U.S. Cl.
USPC .............. 348/223.1; 348/222.1; 382/167

(58) Field of Classification Search
USPC ................. 382/118, 167; 348/223.1
See application file for complete search history.

(56) References Cited

U.S. PATENT DOCUMENTS

| | | | |
|---|---|---|---|
| 7,333,653 B2 * | 2/2008 | Luo et al. | 382/165 |
| 7,450,739 B2 * | 11/2008 | Yonaha | 382/118 |
| 7,747,071 B2 * | 6/2010 | Yen et al. | 382/165 |
| 8,064,694 B2 * | 11/2011 | Yen et al. | 382/173 |
| 2003/0007687 A1 * | 1/2003 | Nesterov et al. | 382/167 |
| 2005/0058342 A1 * | 3/2005 | Chen et al. | 382/167 |

* cited by examiner

*Primary Examiner* — Ngoc-Yen Vu
(74) *Attorney, Agent, or Firm* — Winston Hsu; Scott Margo

(57) ABSTRACT

A method of performing eye correction is performed in an electronic device having an image processor, an image sensor, and a storage device. The image sensor captures image data, detects a pet face in the image data, and locates a plurality of candidate eye regions in the pet face. A classifier of the image processor verifies at least one eye region of the plurality of candidate eye regions, and the image processor recovers an abnormal pupil region of the at least one verified eye region.

11 Claims, 16 Drawing Sheets

| Rgn₁ | Rgn₂ | Rgn₃ |
|------|------|------|
| Rgn₄ | Rgn₀ | Rgn₅ |
| Rgn₆ | Rgn₇ | Rgn₈ |

FIG. 10

METHOD OF AUTOMATICALLY PERFORMING PET EYE CORRECTION

BACKGROUND OF THE INVENTION

1. Field of the Invention

The present invention relates to digital image processing, and more particularly to a method of automatically performing pet eye correction on an image.

2. Description of the Prior Art

Many consumer and professional electronic products, such as digital cameras and digital camcorders include digital image processing integrated circuit chips. Digital image processing may refer to a number of techniques employed to alter digital image data for various purposes. Such techniques may include classification, feature extraction, pattern recognition, projection, and noise reduction. Digital cameras and camcorders may also perform color correction and compression on images captured by an image sensor prior to storing the images on a storage device, such as a flash memory device, a hard disk drive, or an optical disk.

Some digital processing techniques are traditionally performed by software on a personal computer (PC) or workstation. One such technique is red-eye removal. Typically, red-eye removal may be performed manually by a user, and includes selecting eye regions of the image, and desaturating red color pixels thereof. This process is inconvenient for the user.

SUMMARY OF THE INVENTION

According to an embodiment, a method of performing eye correction is performed in an electronic device comprising an image processor, an image sensor, and a storage device. The image sensor captures image data, detects a pet face in the image data, and locates a plurality of candidate eye regions in the pet face. A classifier of the image processor verifies at least one eye region of the plurality of candidate eye regions, and the image processor recovers an abnormal pupil region of the at least one verified eye region.

According to another embodiment, a method of performing eye correction is performed in an electronic device comprising an image processor, an image sensor, and a storage device. The method comprises the image sensor capturing image data, the image processor detecting abnormally-colored regions in the image data, the image processor locating a plurality of candidate eye regions according to the abnormally-colored regions, a classifier of the image processor verifying at least one eye region of the plurality of candidate eye regions, and the image processor recovering an abnormal pupil region of the at least one verified eye region.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a diagram illustrating a filter utilized for rejecting non-pupil abnormal regions.

DETAILED DESCRIPTION

Figure 1:
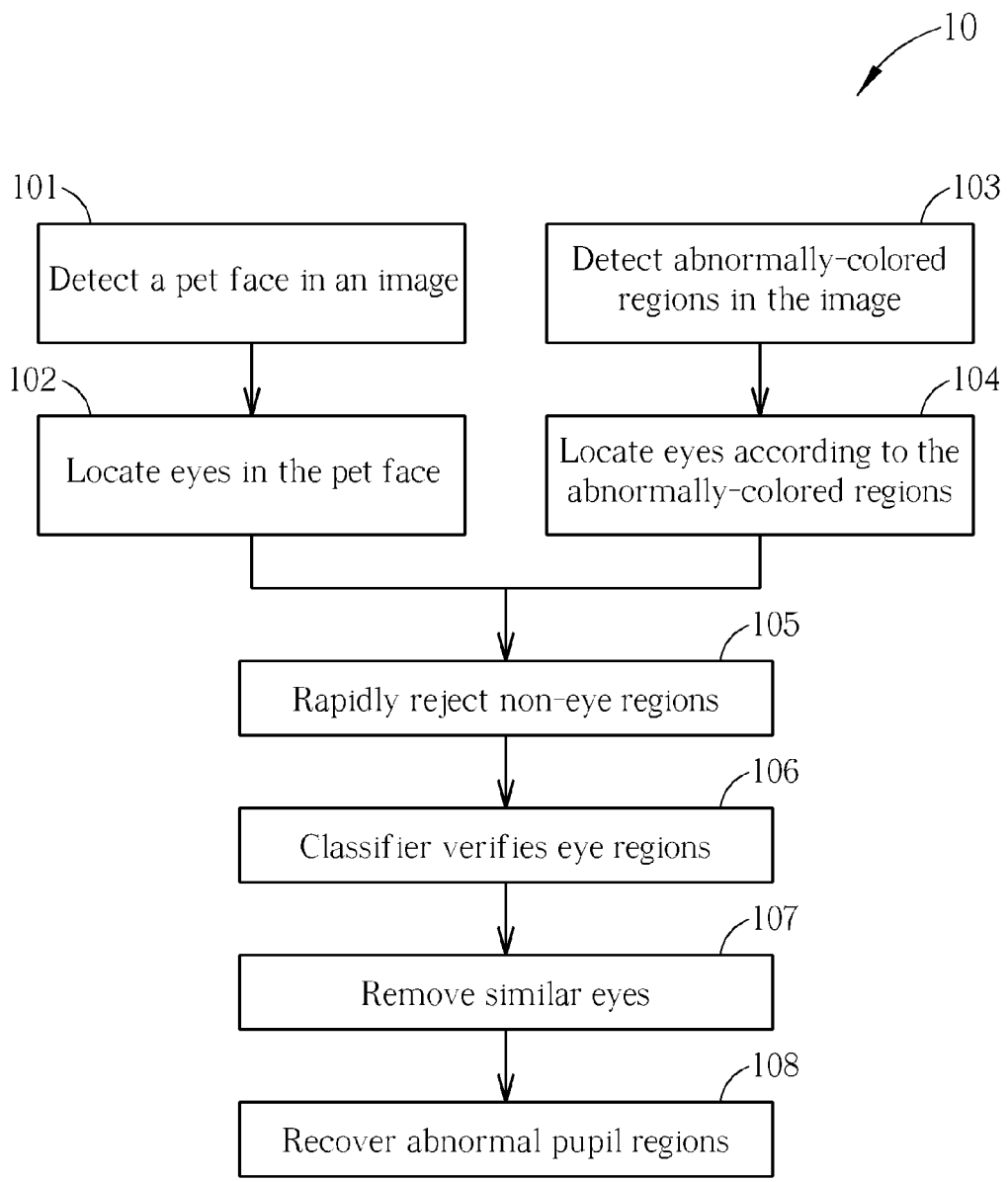
FIG. 1 is a flowchart of a process for automatically performing pet eye correction on an image.

Please refer to FIG. 1, which is a flowchart of a process 10 for automatically performing pet eye correction on an image. The process 10 may be performed in an electronic device, such as a digital camera, which may comprise an image sensor configured for sensing light through a lens, an image processor for processing image data outputted by the image sensor, and a storage device for storing the image data and a processed image generated by the image processor based on the image data. The process 10 may not require human intervention, and may comprise the following steps:

Step 101: Detect a pet face in an image;
Step 102: Locate eyes in the pet face;
Step 103: Detect abnormally-colored regions in the image;
Step 104: Locate eyes according to the abnormally-colored regions;
Step 105: Rapidly reject non-eye regions;
Step 106: Classifier verifies eye regions;
Step 107: Remove similar eyes; and
Step 108: Recover abnormal pupil regions.

Steps 101 and 102, and Steps 103 and 104 may be performed simultaneously, and may all be completed prior to beginning Step 105. Steps 101 and 102 may be optional if Steps 103 and 104 are performed, and Steps 103 and 104 may be optional if Steps 101 and 102 are performed.

Figure 2:
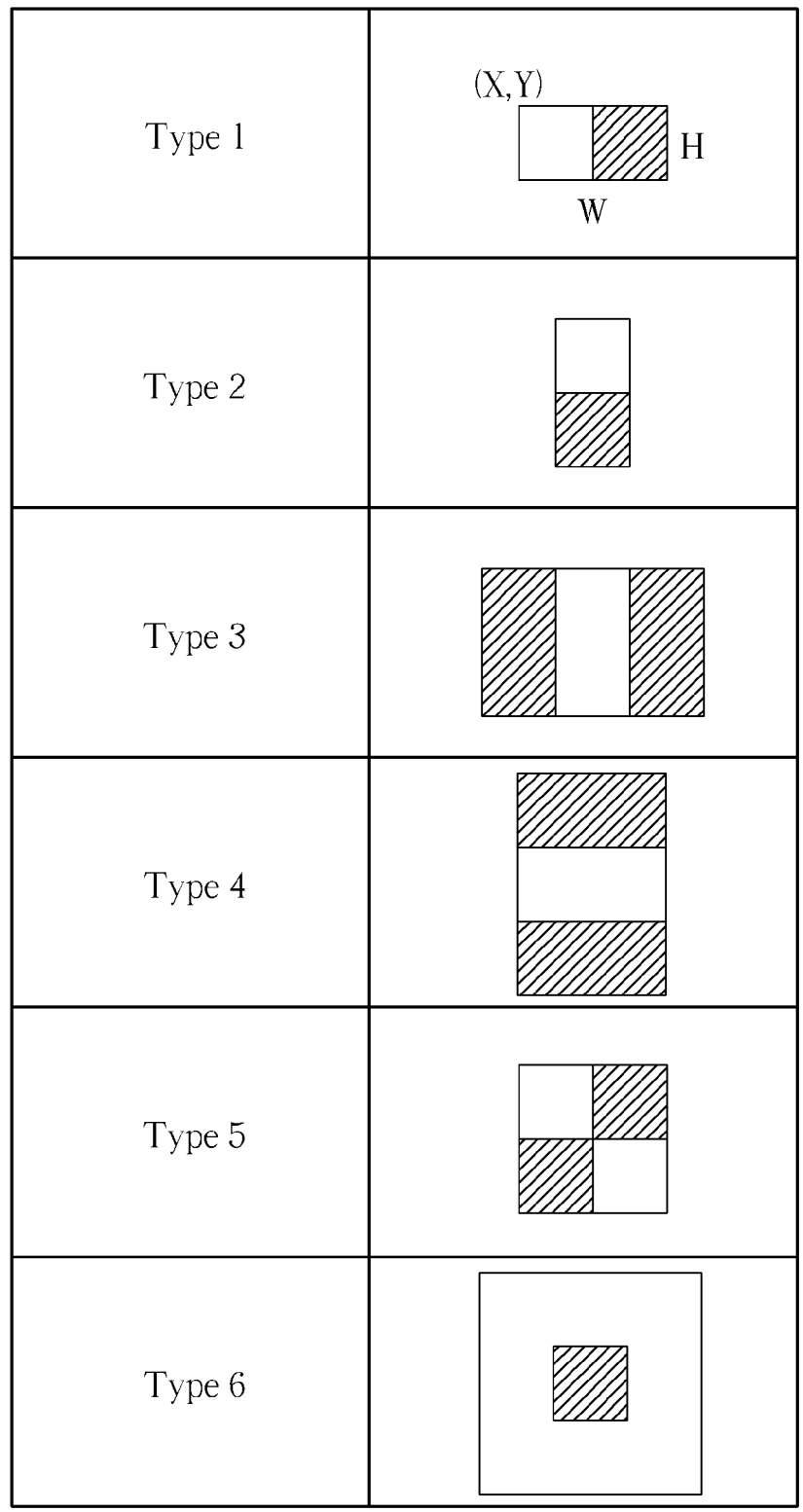
FIG. 2 is a diagram showing weak classifiers that may be utilized together for detecting the pet face in the image.

Please refer to FIG. 2, which is a diagram showing various types of weak classifiers (Type 1, Type 2, ..., Type 6) that may be utilized together for detecting the pet face in the image (Step 101). The weak classifiers may have Haar-like characteristics, and may be represented as Haar (Type, Color, X, Y, W, H). Type may represent characteristic type. Color may represent color channels of the characteristic, e.g. YCbCr (luminance, blue chrominance, red chrominance), where "0" represents the Y channel, "1" represents the Cb channel, and "2" represents the Cr channel. (X, Y) may represent upper-left coordinates of the characteristic. W may represent width of the characteristic. H may represent height of the characteristic. A sliding window technique may be utilized to perform detection of the pet's facial region, with each positive detection response recorded in rectangular fashion.

Figure 3:
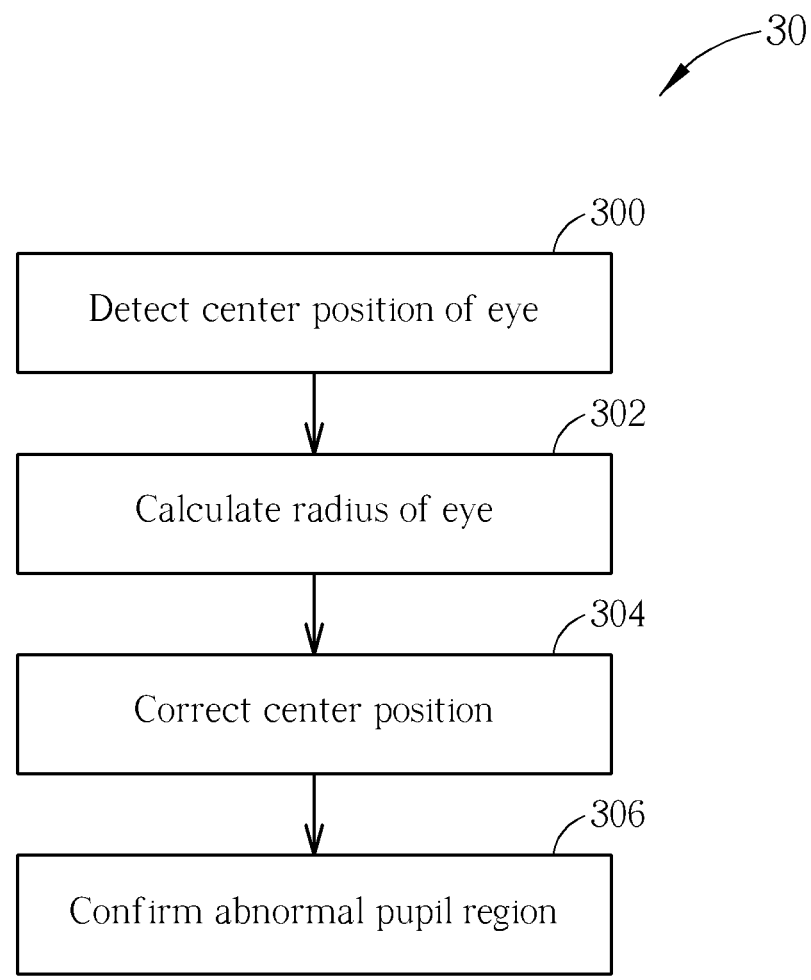
FIG. 3 is a diagram of a process utilized for locating the eyes in the pet face.

Please refer to FIG. 3, which is a diagram of a process 30 utilized for locating the eyes in the pet face (Step 102). The process 30 may be performed to detect the eyes once the face region is known, and may comprise the following steps:

Step 300: Detect center position of the eye;
Step 302: Calculate radius of the eye;
Step 304: Correct the center position; and
Step 306: Confirm an abnormal pupil region.

Figure 4:
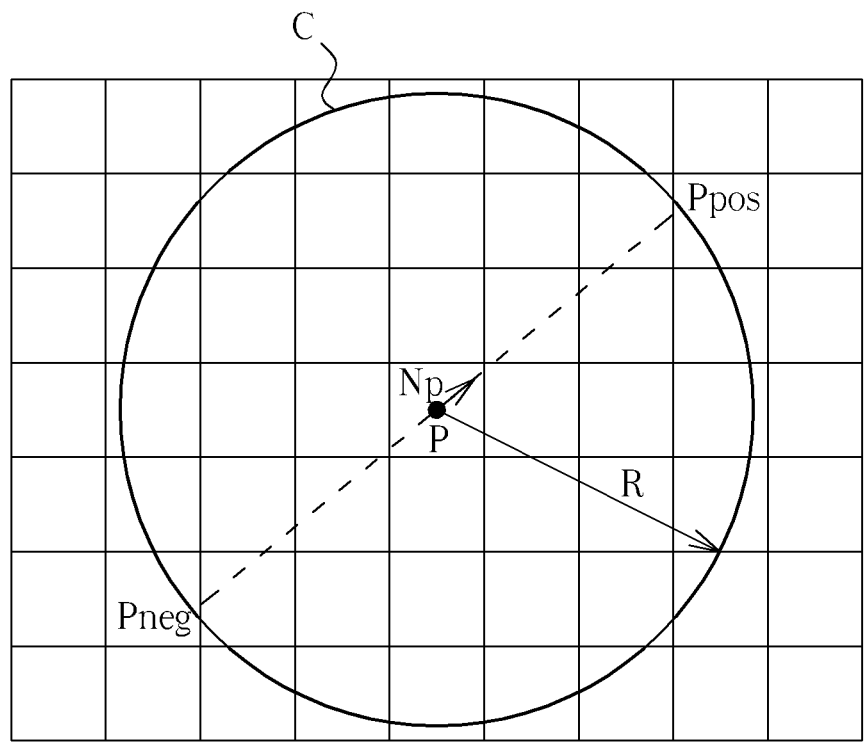
FIG. 4 is a diagram illustrating detection of points of interest in a face region.

Eyes may be one of the most distinct characteristic features of a face. Candidate locations for the eyes of the pet face may be determined by locating the most distinct points of interest in the pet face. First, according to dimensions of the pet face, an estimated eye radius may be calculated. Taking $R_{face}$ as half the shortest dimension of length and width of the pet face, estimated eye radius candidates may be obtained as all whole numbers in a range of $[0.125\ R_{face}, 0.5\ R_{face}]$ Please refer to FIG. 4, which is a diagram illustrating detection of points of interest in a face region. The points of interest may be determined for each estimated eye radius candidate. $p(X,Y)$ may be a pixel location. Gradient $grad_p \vec{n}_p$ may be calculated, where $grad_p$ may be magnitude of the gradient at the pixel location p, and $\vec{n}_p$ may be a unit vector in direction of the gradient. As shown in FIG. 4, $p_{pos}$ may be a positively-affected point of the pixel location p, and $p_{neg}$, may be a negatively-affected point of the pixel location p. Projections M, O may be projections in real space of the point $p(X,Y)$, may be initialized to zero, and may be updated according to the following equations:

$$M(p_i) = M(p_i) + \frac{\overrightarrow{(p_i - p)}}{\|p_i - p\|} \cdot \vec{n}_p grad_p \tag{1}$$

$$O(p_i) = O(p_i) + \frac{\overrightarrow{(p_i - p)}}{\|p_i - p\|} \cdot \vec{n}_p \tag{2}$$

where i may be positive or negative. After traversing each point of the face region, M and O may be normalized to $$\overline{M} = \frac{M}{\max(M)} \text{ and } \overline{O} = \frac{O}{\max(O)}.$$

Defining $V_R = \overline{M} \times \overline{O}$ solute maximum and/or minimum of $V_R$ may become a point of interest $IP_R$ in the radius R. Noise cancellation may be performed to detect the most distinctive points of interest of the face region. Defining $V = \Sigma V_R$, each absolute maximum and/or minimum of V may represent a distinctive point of interest IP of the face region.

Knowing the distinctive point of interest IP, the radius of the eye region may be calculated (Step 302) by averaging radii of three points of interest $IP_R$ exhibiting largest response in a surrounding region of the radius R to obtain the target radius corresponding to the distinctive point of interest IP. If no related point of interest $IP_R$ is found in the surrounding area of the distinctive point of interest IP, the radius of the eye region may be set to $0.125\ R_{face}$.

Figure 5:
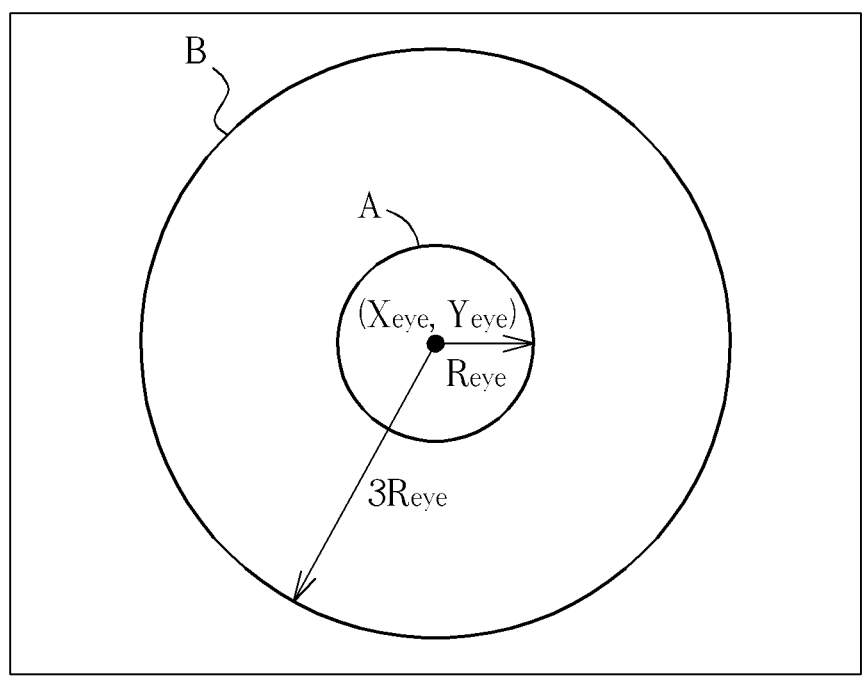
FIG. 5 is a diagram illustrating correcting the center position of the eye.

Please refer to FIG. 5, which is a diagram illustrating correcting the center position of the eye (Step 304). In Steps 300 and 302, target objects corresponding to each distinctive point of interest IP in the face region may be eye candidate regions. An eye center $(X_{eye}, Y_{eye})$ may be defined as position of the distinctive point of interest IP, and an eye radius $R_{eye}$ may be radius of the target object corresponding to the distinctive point of interest IP. Difference information of abnormal colors of the eye and surrounding lashes may be utilized to perform correction of the eye center.

First, standard red-green-blue (sRGB) color space may be divided into a 32×32×32 three-dimensional (3D) space, where color indexes of colors $(r_0, g_0, b_0)$ may be expressed as $$\left(\left[\frac{r_0}{8}\right], \left[\frac{g_0}{8}\right], \left[\frac{b_0}{8}\right]\right).$$

Singular value may be calculated for each pixel in the eye region. As shown in FIG. 5, two regions A, B may be determined for each eye candidate area $(X_{eye}, Y_{eye}, R_{eye})$. The region A may be a circle having center $(X_{eye}, Y_{eye})$ and radius $R_{eye}$. The region B may be a circular doughnut having center $(X_{eye}, Y_{eye})$, outer radius $3\ R_{eye}$, and inner radius $R_{eye}$. Letting HistA(ir,ig,ib) represent number of pixels for each color distribution HistB(ir,ig,ib) index and represent number of pixels for each color distribution index (ir,ig,ib), the singular value for each pixel p may be defined as:

$$\text{Singularity}(p) = \begin{cases} \frac{HistA(ir_p, ig_p, ib_p)}{HistA(ir_p, ig_p, ib_p) + HistB(ir_p, ig_p, ib_p)} & HistA(ir_p, ig_p, ib_p) + \\ & HistB(ir_p, ig_p, ib_p) > 0 \\ 0 & HistA(ir_p, ig_p, ib_p) + \\ & HistB(ir_p, ig_p, ib_p) = 0 \end{cases}$$

where $(ir_p, ig_p, ib_p)$ may be a distribution index value corresponding to the pixel p. Utilizing the singular value as a weighting, weighted averages $(\overline{X}, \overline{Y})$ of pixel positions in the region A may be calculated as a corrected position of the eye center, where:

$$\overline{X} = \frac{\sum_{p \in A}(X_p \times \text{Singularity}(p))}{\sum_{p \in A} \text{Singularity}(p)}, \text{ and} \tag{3}$$

$$\overline{Y} = \frac{\sum_{p \in A}(Y_p \times \text{Singularity}(p))}{\sum_{p \in A} \text{Singularity}(p)}. \tag{4}$$

Figure 6:
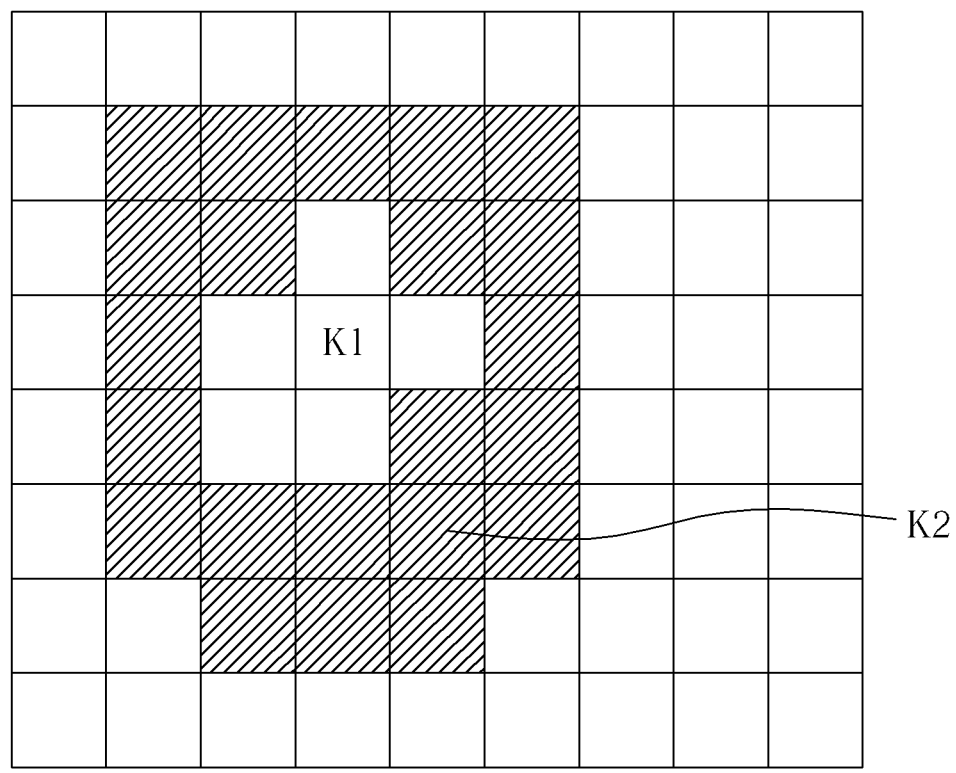
FIG. 6 is a diagram of performing verification of abnormal pupil regions.

Please refer to FIG. 6, which is a diagram of performing verification of abnormal pupil regions. In the YCbCr color space, K-means segmentation may be performed on the eye region to obtain K segments according to color similarity, where K is preferably equal to 7. Color of each segment may be surveyed. If the color of the segment is not an abnormal color, such as red, blue, green, or white, the segment may be determined not to be an abnormal pupil region. Filling and Roundness may be used as two indicators for verifying shape of the segment. Filling and Roundness may be expressed as:

$$\text{Filling} = \frac{S(K1)}{S(K2)} \tag{5}$$

$$\text{Roundness} = \frac{4 \times \pi \times S(K2)}{L^2(K2)} \tag{6}$$

As shown in FIG. 6, a first segment K1 may be a center empty segment, a second segment K2 may be a combination of a black-colored region and the first segment K1 representing an untested abnormal region. S(K1) and S(K2) and may represent areas of the first segment K1 and the second segment K2, respectively. L(K2) may be perimeter of the second region K2. If Filling<0.75 and Roundness>0.9 for a segment, the segment may be a pupil region. Otherwise, the segment may be considered a false pupil region. If multiple pupil regions are found and verified, one segment may be selected as a final abnormal pupil region based on priority of red, green, and blue colors.

Figure 7:
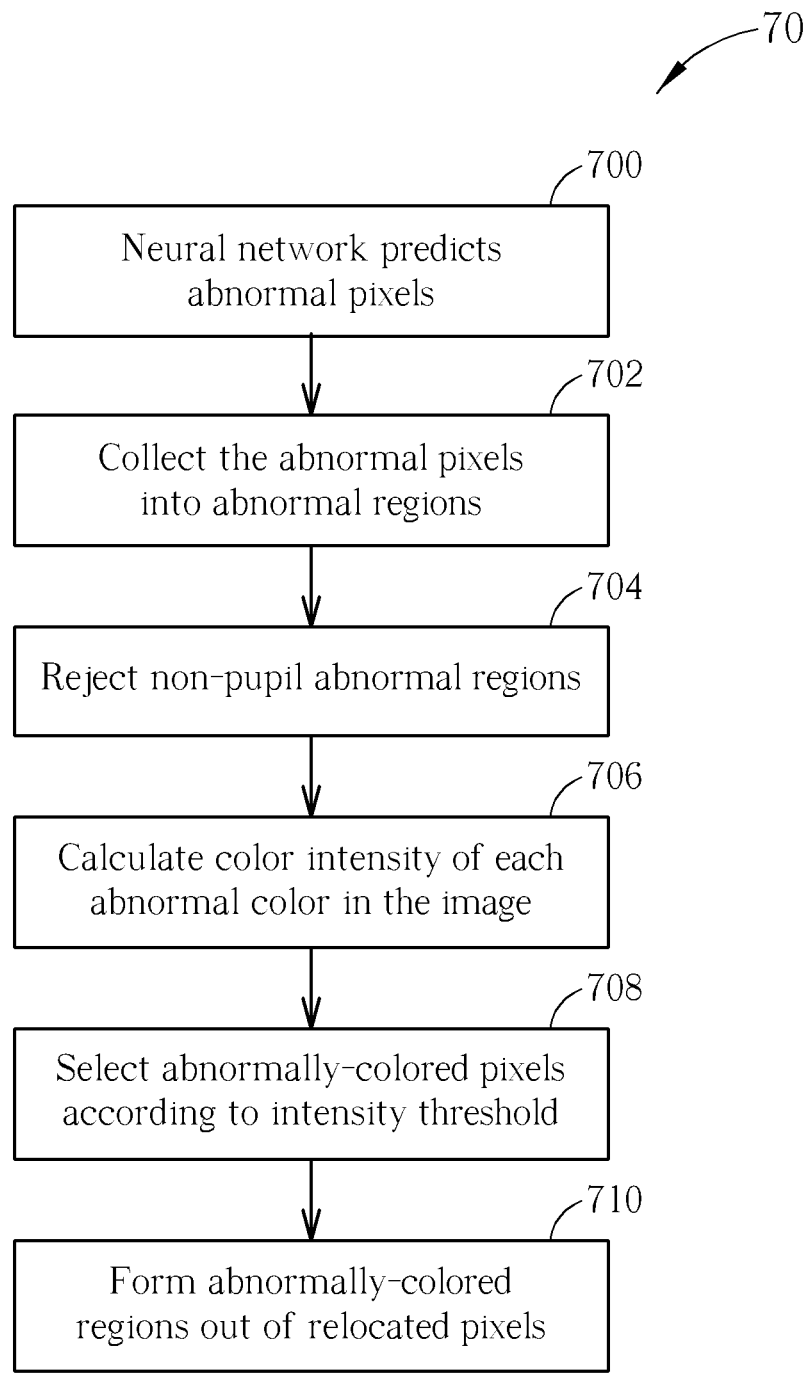
FIG. 7 is a flowchart of a process for detecting abnormally-colored regions in the image.

Please refer to FIG. 7, which is a flowchart of a process 70 for detecting abnormally-colored regions in the image. The process 70 may comprise the following steps:

Step 700: Utilize neural network to predict abnormal pixels;

Step 702: Group the abnormal pixels into abnormal regions;

Step 704: Reject non-pupil abnormal regions;

Step 706: Calculate color intensity of each abnormal color in the image;

Step 708: Select abnormally-colored pixels according to an intensity threshold; and Step 710: Form abnormally-colored regions out of relocated pixels.

Figure 8:
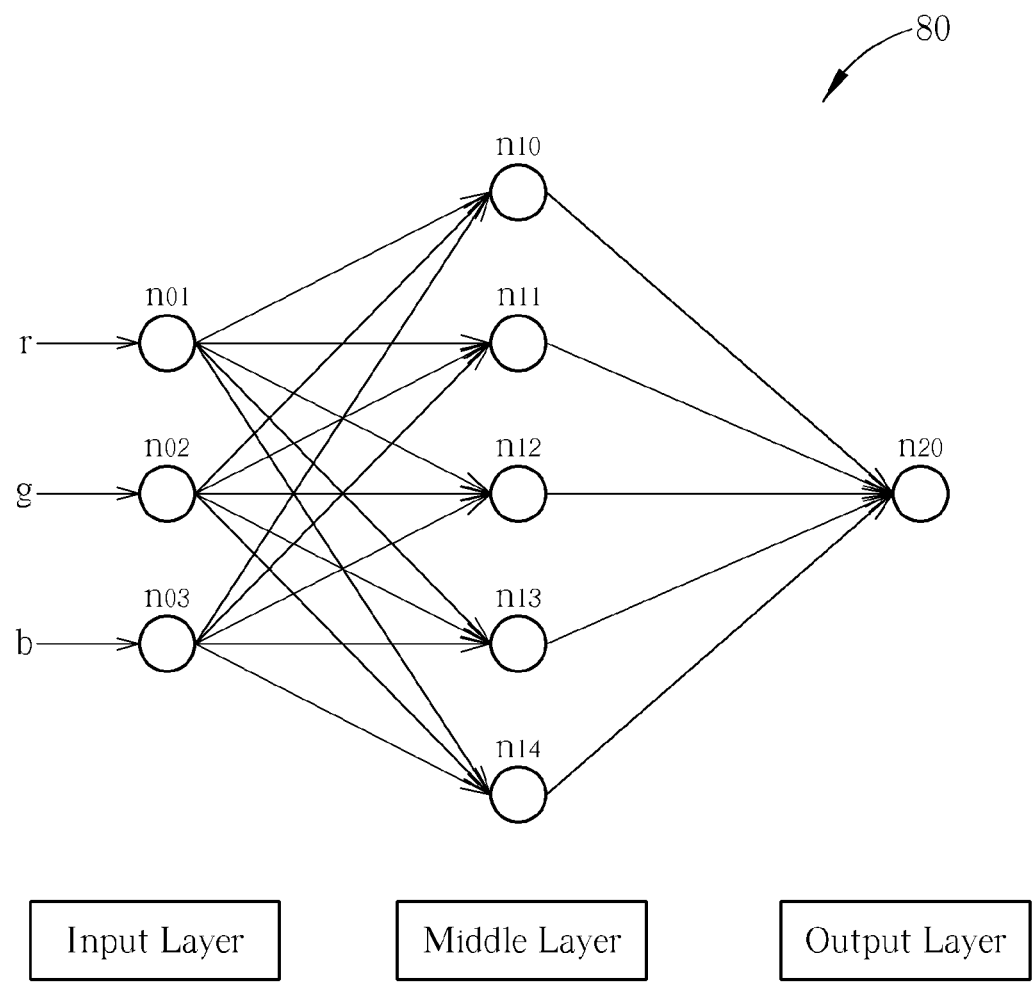
FIG. 8 is a diagram illustrating utilizing a neural network to predict abnormal pixels.

Please refer to FIG. 8, which is a diagram illustrating utilizing a neural network 80 to predict abnormal pixels (Step 700). According to a previously obtained abnormal sample, in sRGB space, red (r), green (g), and blue (b) values for each abnormal color may be selected as samples for training the neural network 80. The neural network 80 may be a back-propagation (BP) neural network having three layers, as shown in FIG. 8. An input layer may comprise three nodes n00, n01, n02. A middle layer may comprise five nodes n10, n11, n12, n13, n14. An output layer may comprise one node n20. The neural network 80 obtained through the training process may be utilized for predicting abnormal pixels, and each pixel of the image may be marked as a normal pixel or a red, green, blue, or other abnormal pixel.

Figure 9:
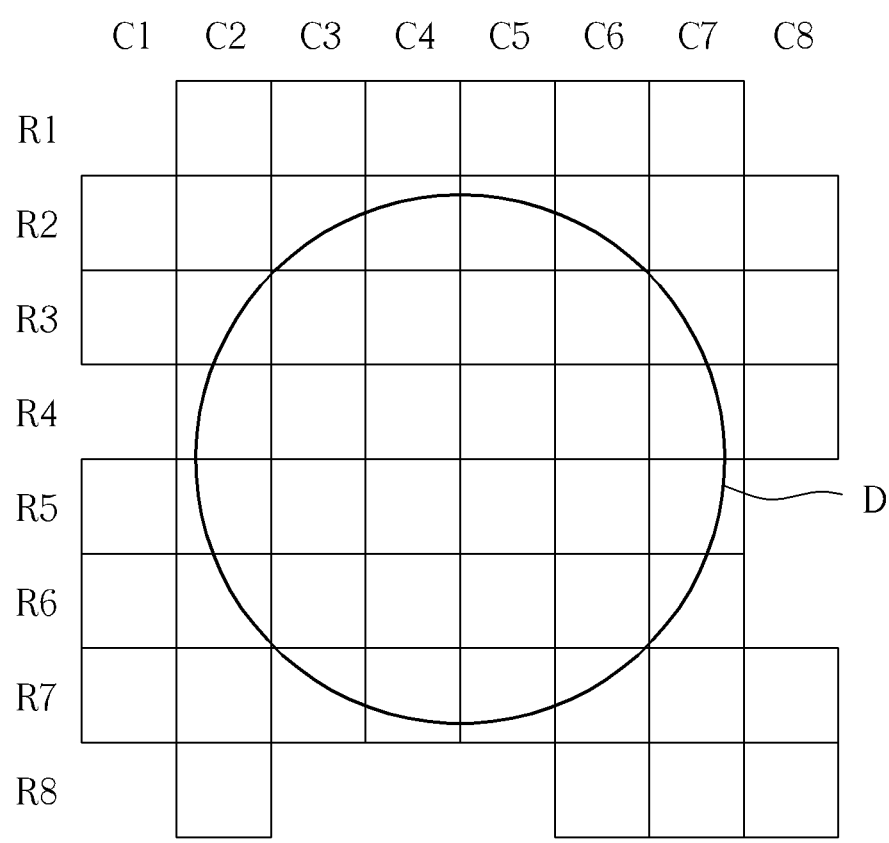
FIG. 9 is a diagram illustrating grouping the abnormal pixels into abnormal regions.

Please refer to FIG. 9, which is a diagram illustrating grouping the abnormal pixels into abnormal regions (Step 702). A plurality of connected abnormal pixels may be grouped into abnormal regions, such as a region D, as shown in FIG. 9. The plurality of abnormal pixels may be located at intersection points of a plurality of pixel columns C1-C8 and a plurality of pixel rows R1-R8. Once abnormal regions, such as the region D, are formed, non-pupil abnormal regions of the abnormal regions may be rejected (Step 704). Please refer to FIG. 10, which is a diagram illustrating a filter that may be utilized for rejecting non-pupil abnormal regions. As shown in FIG. 10, a first region $Rgn_0$ may be an abnormal region. An estimation result generated by the neural network may be utilized to sum number $N_{pupil}$ of abnormal pixels of the first region $Rgn_0$ and number $N_{neighbor}$ of abnormal pixels of neighboring regions $Rgn_i$ (i=1, 2, 3, ..., 8). If the number $N_{pupil}$ and the number $N_{neighbor}$ satisfy the following condition:

$$N_{pupil} < 8 N_{neighbor}$$

the first region $Rgn_0$ may be rejected as a non-pupil abnormal region.

Chromaticity of abnormal colors, such as red, green, blue, white, etc., in the image may be calculated individually. The chromaticities may represent probability that the pixel will be grouped into an abnormal eye. In sRGB color space, intensity definition of each color may be decided through respective red, green, and blue values, such as by the following equation:

$$f = \frac{c_1 r + c_2 g + c_3 b}{a_1 r + a_2 g + a_3 b} \tag{7}$$

where f may represent chromaticity, r may represent a red component, g may represent a green component, b may represent a blue component, $c_1$ may be a red component coefficient, $c_2$ may be a green component coefficient, $c_3$ may be a blue component coefficient, $a_1$ may be a red component brightness coefficient, $a_2$ may be a green component brightness coefficient, and $a_3$ may be a blue component brightness coefficient. A set of coefficients for representing redness may be: $c_1=0.5$, $c_2=0.5$, $c_3=-1$, $a_1=0.299$, $a_2=0.587$, $a_3=0.114$. Defining redness as $f_{red}$ the above equation may be rewritten as:

$$f_{red} = \frac{r + b - 2g}{2(0.299r + 0.587g + 0.114b)}. \tag{8}$$

In YCbCr color space, redness may be represented as:

$$f_{red} = \frac{1.41514(Cr - 128) + 1.23014(Cb - 128)}{0.299r + 0.587g + 0.114b}. \tag{9}$$

Greenness $f_{green}$, blueness $f_{blue}$, and whiteness $f_{white}$ may be further defined as:

$$f_{green} = \frac{g}{r+g}, \tag{10}$$

$$f_{blue} = \frac{b}{r+b}, \text{ and} \tag{11}$$

$$f_{white} = 0.299r + 0.587g + 0.114b \tag{12}$$

Abnormally-colored pixels may be selected according to an intensity threshold (Step 708). Pixels having chromaticity greater than the intensity threshold may be selected as abnormal eye pixels. For example, if $f_{red}$>0.5 for a reddish pixel, the reddish pixel may be defined as an abnormally-red pixel; if $f_{blue}$>0.5 for a bluish pixel, the bluish pixel may be defined as an abnormally-blue pixel, and likewise for definition of other abnormally-colored pixels. Selected abnormally-colored regions may be relocated (Step 710) utilizing the method described for grouping the abnormal pixels into abnormal pixel regions illustrated in FIG. 9.

Figure 11:
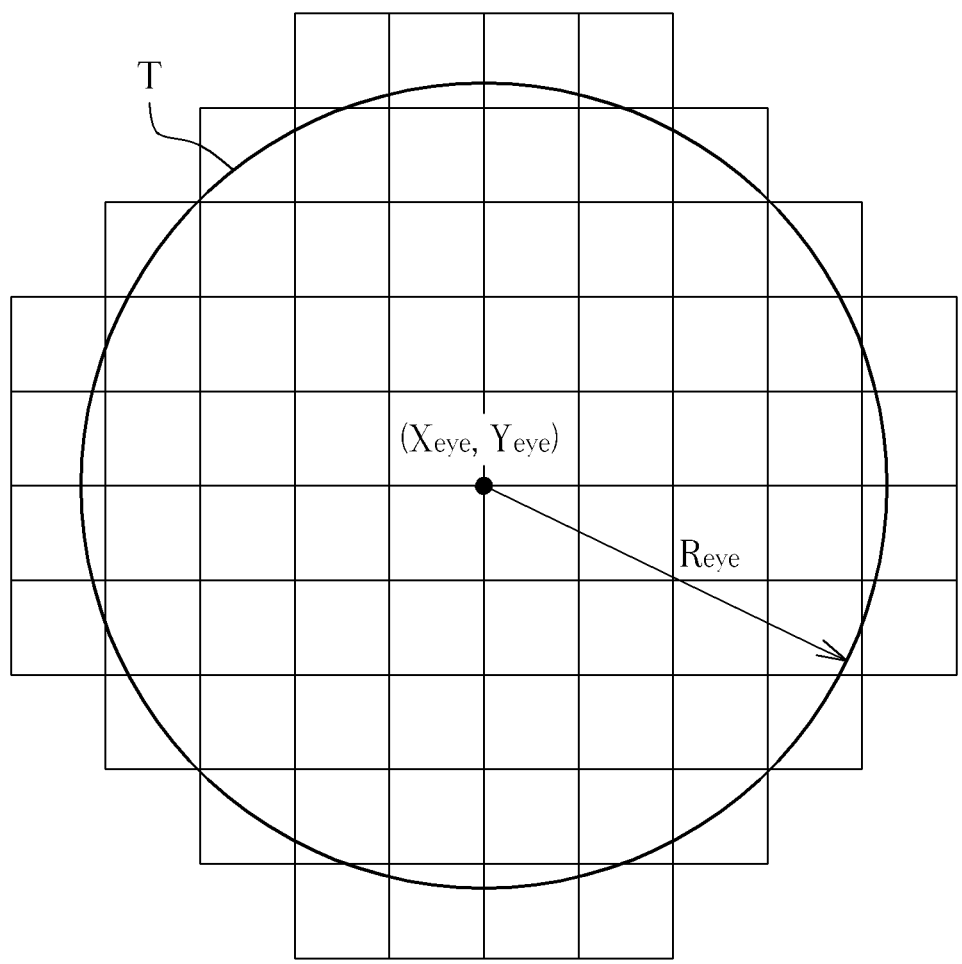
FIG. 11 is a diagram illustrating locating eyes according to the abnormally-colored regions.

Please refer to FIG. 11, which is a diagram illustrating locating eyes according to the abnormally-colored regions (Step 104). As shown in FIG. 11, the eyes may be located through use of the abnormally-colored regions as follows:

$$X_{eye} = \frac{X_{min} + X_{max}}{2}, \tag{13}$$

$$Y_{eye} = \frac{Y_{min} + Y_{max}}{2}, \text{ and} \tag{14}$$

$$R_{eye} = \frac{X_{max} - X_{min} + Y_{max} - Y_{min}}{4}, \tag{15}$$

where $X_{min}$, $X_{max}$, $Y_{min}$, and $Y_{max}$ may represent minimum X-axis coordinate, maximum X-axis coordinate, minimum Y-axis coordinate, and maximum Y-axis coordinate of all pixels of an abnormally-colored region, respectively.

Figure 12:
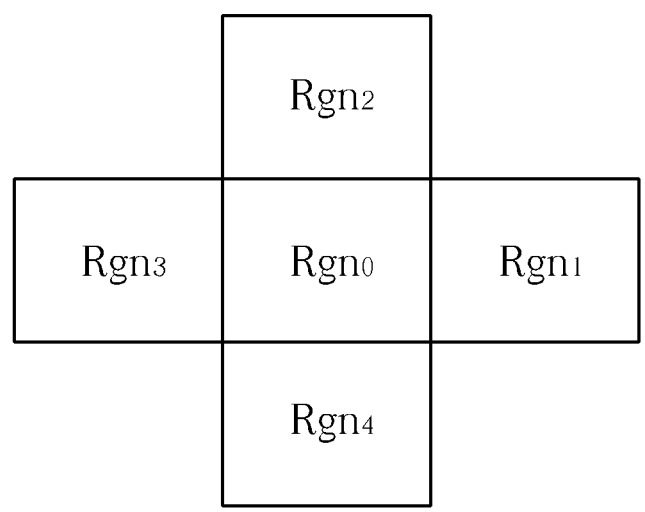
FIG. 12 is a diagram illustrating utilizing texture information to reject false target objects.

Rapid rejection of non-eye regions may be performed (Step 105). Please refer to FIG. 12, which is a diagram illustrating utilizing texture information to reject false target objects. Given a candidate eye region having location and radius $(X_{eye}, Y_{eye}, R_{eye})$, five neighboring regions $Rgn_0, Rgn_1, \ldots, Rgn_4$ may be constructed, as shown in FIG. 12. A first region Rgn0 may be a square region having a center $(X_{eye}, Y_{eye})$ and side length $2R_{eye}+1$. Letting $G_i$ represent average gradient (on gray channel) of each neighboring region $Rgn_i$, where i=0, 1, 2, 3, 4, if the following two conditions:

$$G_0>1, \text{ and}$$

$$G_0-G_i>0, i=1,2,3,4$$

are not satisfied by the candidate eye region, the candidate eye region may be rejected as a false eye.

Color information may be utilized to reject false target objects. Given a candidate eye region having location and radius $(X_{eye}, Y_{eye}, R_{eye})$, where $(X_{eye}, Y_{eye})$ may be center of the eye region, and $R_{eye}$ may be radius of a region A, singular values for each pixel in the region A may be calculated as described above for Step 304 (region A in FIG. 5). If the candidate eye region does not satisfy the following condition:

$$\frac{\sum_{p \in C} N(p)}{3.14 \times R_{eye}^2} > 0.1,$$

where $$N(p) = \begin{cases} 1 & \text{Singularity}(p) > 0.9 \\ 0 & \text{otherwise,} \end{cases}$$

the candidate eye region may be rejected as a false target object.

Figure 13:
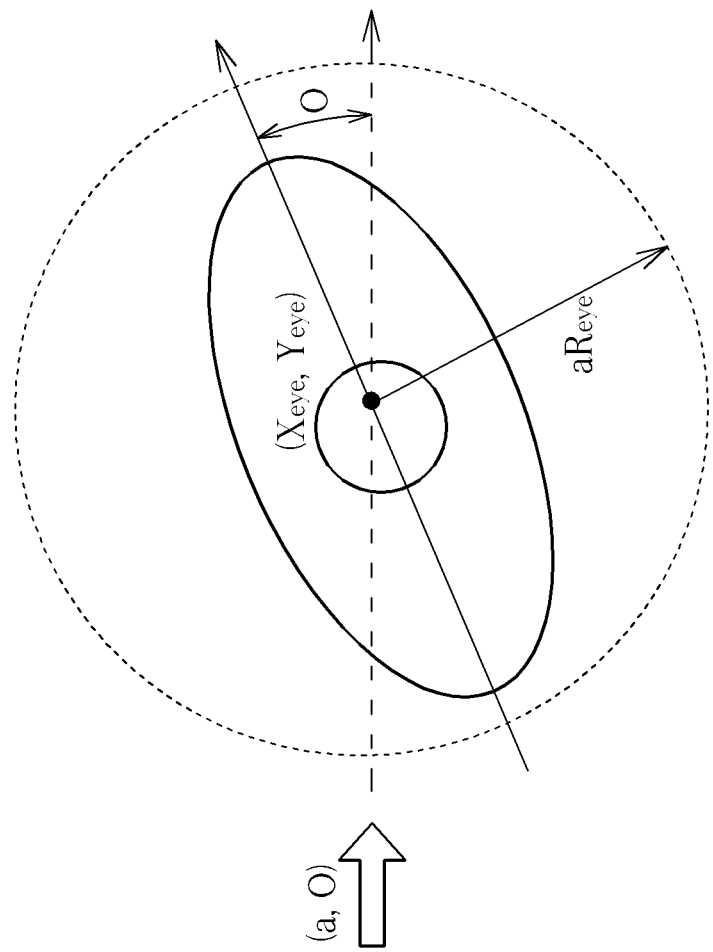
FIG. 13 is a diagram illustrating utilizing a classifier to verify the eye regions.

Please refer to FIG. 13, which is a diagram illustrating utilizing a classifier to verify the eye regions (Step 106). A pet eye classifier may be trained, and the Haar-like characteristic described above may be utilized. Given a candidate eye region having location and radius $(X_{eye}, Y_{eye}, R_{eye})$, a candidate target set $EC_{ij}=\{(X_{eye}, Y_{eye}, \alpha_i R_{eye}, O_j)\}$, where $\alpha_i=0$ and $0 \leq O_j \leq 360$, may be formed. $EC_{ij}$ may represent a result of rotating a square region having center $(X_{eye}, Y_{eye})$ and side length $2\alpha_i R_{eye}+1$ by $O_j$ degrees. FIG. 13 may illustrate this process. The left side of FIG. 13 may represent an original candidate target having center $X_{eye}, Y_{eye}$, radius $R_{eye}$, and rotation angle 0°. The right side of FIG. 13 may represent a new candidate target having center $(X_{eye}, Y_{eye})$, radius $\alpha R_{eye}$, and rotation angle O formed by performing a transformation on the original candidate target utilizing parameters $(\alpha, O)$. If none of the candidate target set $EC_{ij}$ passes verification by the classifier, the candidate eye target may be considered a false target; else, the candidate eye target may be considered an eye. Ranges of the parameters $(\alpha, O)$ may be $\alpha \in (0.5, 5)$, and $O \in \{0°, 90°, 180°, 270°\}$.

Figure 14:
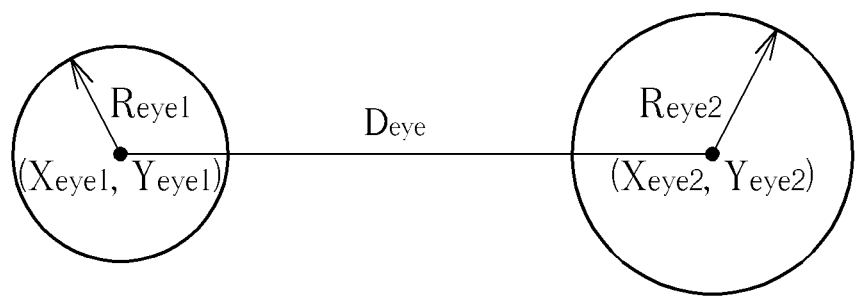
FIG. 14 is a diagram illustrating removal of similar eyes.

Please refer to FIG. 14, which is a diagram illustrating removal of similar eyes (Step 107). As shown in FIG. 14, two neighboring candidate eyes may be identified. Let $R_{eye1}$ represent radius of a first eye of the two neighboring candidate eyes, $R_{eye2}$ represent radius of a second eye of the two neighboring candidate eyes, and $D_{eye}$ represent Euclidean distance between centers of the two neighboring candidate eyes. For each eye, according to the regions A, B defined above for Step 304 (see FIG. 5), color intensities $f_A, f_B$ may be calculated (see above description of Step 706). Defining color contrast of each eye as $f_A-f_B$, color contrasts of the two neighboring candidate eyes may be respectively defined as $f_{A1}-f_{B1}$ and $f_{A2}-f_{B2}$. If $D_{eye}<1.5(R_{eye1}+R_{eye2})$, the two neighboring candidate eyes may be determined to be conflicting. Simultaneously comparing the color contrasts of the two neighboring candidate eyes, if $f_{A1}-f_{B1}<f_{A2}-f_{B2}$, the first eye is considered a false eye. If $f_{A1}-f_{B1}<f_{A2}-f_{B2}$, the second eye is considered a false eye.

Please refer again to FIG. 6, which may be utilized for illustrating recovery of abnormal pupil regions (Step 108). As shown in FIG. 6, black squares may represent abnormal pixels, and white squares may represent non-abnormal pixels. The abnormal pixels and the non-abnormal pixels of the abnormal eye region may be utilized to train a Bayesian classifier for determining the abnormal pixels of the image. The Bayesian classifier may be defined by the following:

$$P(x,y)=P(x|y)P(y)=P(y|x)P(x), \tag{16}$$

where P(x) may represent probability of a pixel's color intensity value equaling "x", and P(y) may represent probability of a pixel's format being an abnormal pixel (i.e., y=1) or a non-abnormal pixel (i.e., Y=0). P(x,y) may represent combined probability that a pixel's color intensity is "x" and the pixel's pixel mode is "y". P(x|y) may represent probability that a pixel's color intensity is "x" under the assumption that the pixel's pixel mode is "y". From the above equation for P(x,y), it may be seen that when probability of a pixel being an abnormal pixel and the pixel's color intensity being "x" is expressed as:

$$P(x,y=1)=P(x|y=1)P(y=1)=P(y=1|x)P(x), \tag{17}$$

then:

$$P(y=1|x) = \frac{P(x|y=1)P(y=1)}{P(x)}. \tag{18}$$

From the above equation (16) for P(x,y) it can be seen that, when the probability of the pixel being a non-abnormal pixel and having color intensity x is represented as:

$$P(x,y=0)=P(x|y=0)P(0)=P(y=0|x)P(x), \tag{19}$$

$$P(y=0|x) = \frac{P(x|y=0)P(y=0)}{P(x)}. \tag{20}$$

In practice, when P(y=1|x)>P(y=0|x), the pixel is considered an abnormal pixel. According to equations (18) and (20) above, this may be expressed as:

$$\frac{P(x|y=1)P(y=1)}{P(x)} > \frac{P(x|y=0)P(y=0)}{P(x)}, \text{ and} \tag{21}$$

$$P(x|y=1)P(y=1)>P(x|y=0)P(y=0). \tag{22}$$

Figure 15:
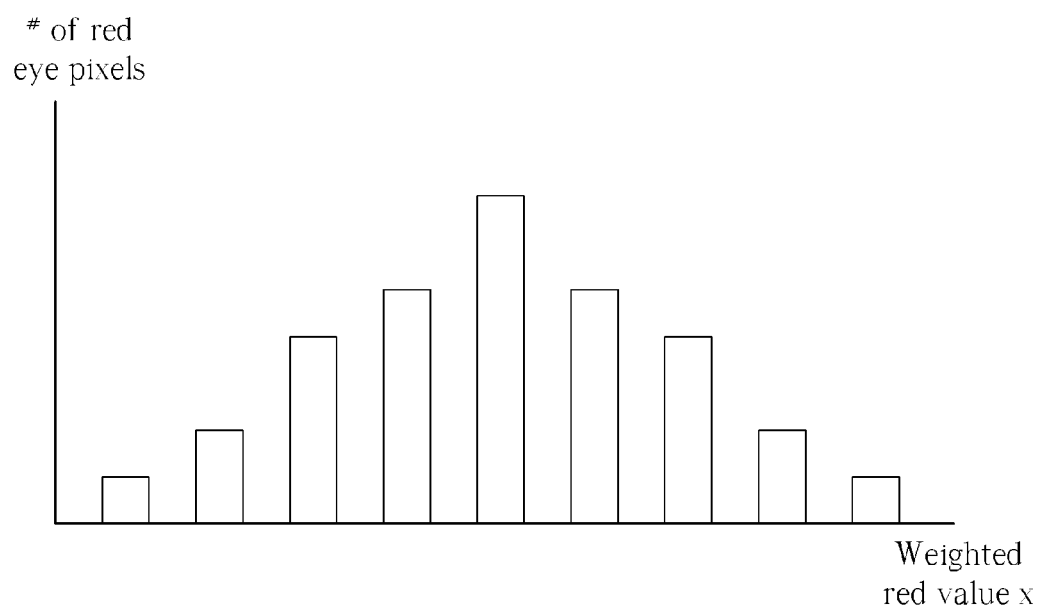
FIG. 15 is a diagram showing an example of a histogram of abnormal pixels in an eye region.
Figure 16:
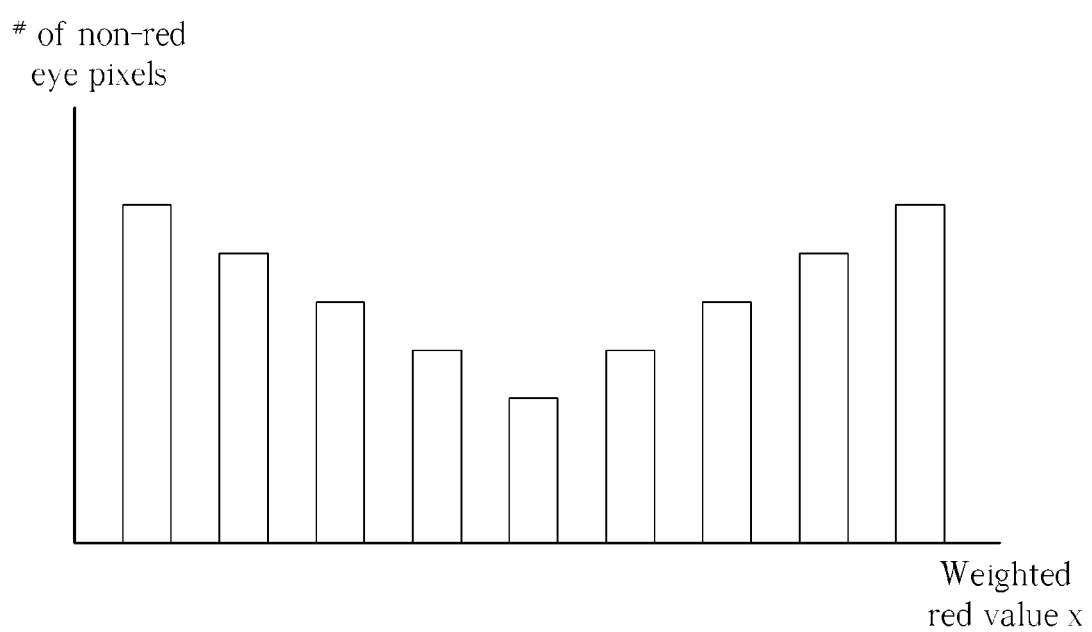
FIG. 16 is a diagram showing an example of a histogram of non-abnormal pixels in the eye region.

Please refer to FIG. 15 and FIG. 16. FIG. 15 is a diagram showing an example of a histogram of abnormal pixels in the eye region. FIG. 16 is a diagram showing an example of a histogram of non-abnormal pixels in the eye region. The probabilities P(x|y=1), P(y=1), P(x|y=0), P(y=0) in the eye region may be utilized to train the Bayesian classifier. The probability P(x|y=1) may be obtained through a histogram of the eye region, as shown in FIG. 15. For a given color intensity x, the probability P(x|y=1) may represent percentage of all abnormal pixels having the color intensity x. The probability P(x|y=0) may be obtained through a histogram of non-abnormal pixels, such as the histogram shown in FIG. 16. The probability P(x|y=0) may represent percentage of all non-abnormal pixels in the eye region having color intensity x. The probability P(y=1) may be percentage of all pixels in the eye region that are abnormal pixels. The probability P(y=0) may be percentage of all pixels in the eye region that are non-abnormal pixels. Assuming a pixel p has color ($Y_{old}$, $Cb_{old}$, $Cr_{old}$), a corresponding color intensity thereof may be $f_p$. If condition (22) is not met, the pixel p need not be recovered. Else, the following equations (23), (24), (25), (26), may be utilized to calculate new color ($Y_{new}$, $Cb_{new}$, $Cr_{new}$) of the pixel p:

$$B(f_p) = \frac{P(f_p \mid y = 1)P(y = 1)}{P(f_p \mid y = 1)P(y = 1) + P(f_p \mid y = 0)P(y = 0)} \quad (23)$$

$$Y_{new} = 40 \times B(f_p) + Y_{old} \times (1 - B(f_p)) \quad (24)$$

$$Cb_{new} = Cb_{old} \times (1 - B(f_p)) \quad (25)$$

$$Cr_{new} = Cr_{old} \times (1 - B(f_p)) \quad (26)$$

As can be seen from the above, the embodiments provide methods for automatically performing eye correction in an electronic device. The methods may be suitable for use in a digital camera or a digital camcorder, and may be applied to correction of animal eye pixels in digital images. The method may be utilized for correcting the red-eye effect in images prior to storing the images in the storage device.

Those skilled in the art will readily observe that numerous modifications and alterations of the device and method may be made while retaining the teachings of the invention.

What is claimed is:

1. A method of performing eye correction in an electronic device comprising an image processor, an image sensor, and a storage device, the method comprising:
   the image sensor capturing image data;
   the image processor detecting a pet face in the image data;
   the image processor locating a plurality of candidate eye regions in the pet face;
   a classifier of the image processor verifying at least one eye region of the plurality of candidate eye regions; and
   the image processor recovering an abnormal pupil region of the at least one verified eye region by changing a color of each pixel in the abnormal pupil region to a dark color according to following formulas:

$Y_{new} = 40 \times B(f_p) + Y_{old} \times (1 - B(f_p))$;

$Cb_{new} = Cb_{old} \times (1 - B(f_p))$; and $Cr_{new} = Cr_{old} \times (1 - B(f_p))$;

where $$B(f_p) = \frac{P(f_p \mid y = 1)P(y = 1)}{P(f_p \mid y = 1)P(y = 1) + P(f_p \mid y = 0)P(y = 0)}, f_p$$

is color intensity of the pixel, $P(f_p|y=1)$ is probability of the color intensity equaling $f_p$ when the pixel is abnormally-colored, $P(y=1)$ is probability of the pixel being abnormally-colored, $P(f_p|y=0)$ is probability of the color intensity equaling $f_p$ when the pixel is not abnormally-colored, $P(y=0)$ is probability of the pixel not being abnormally-colored, $Y_{old}$ is Y-component of the color, $Y_{new}$ is Y-component of the dark color, $Cb_{old}$ is Cb-component of the color, $Cb_{new}$ is Cb-component of the dark color, $Cr_{new}$ is Cr-component of the color, and $Cr_{old}$ is Cr-component of the dark color.

2. The method of claim 1, further comprising:
   the image processor rejecting at least one non-eye region of the plurality of candidate eye regions.

3. The method of claim 1, further comprising:
   the image processor removing a similar eye region of the at least one verified eye region.

4. The method of claim 1, wherein the image processor locating the plurality of candidate eye regions in the pet face comprises:
   the image processor detecting a center position of an eye region of the plurality of candidate eye regions;
   the image processor calculating a radius of the eye region;
   the image processor correcting the center position; and
   the image processor confirming an abnormal pupil region of the eye region.

5. A method of performing eye correction in an electronic device comprising an image processor, an image sensor, and a storage device, the method comprising:
   the image sensor capturing image data;
   the image processor detecting a pet face in the image data;
   the image processor locating a plurality of candidate eye regions in the pet face by:
     detecting a center position of an eye region of the plurality of candidate eye regions;
     calculating a radius of the eye region;
     correcting the center position; and
     calculating filling and roundness of a candidate pupil region of the eye region according to following formulas:

$$\text{Filling} = \frac{S(K1)}{S(K2)}; \text{ and}$$

$$\text{Roundness} = \frac{4 \times \pi \times S(K2)}{L^2(K2)};$$

where K1 is a center empty segment, K2 is the candidate pupil region, S(K1) and S(K2) represent areas of the first segment K1 and K2, respectively, and L(K2) is perimeter of K2; and
   the image processor confirming the candidate abnormal region when Filling<0.75 and Roundness<0.9;
   a classifier of the image processor verifying at least one eye region of the plurality of candidate eye regions; and
   the image processor recovering an abnormal pupil region of the at least one verified eye region.

6. A method of performing eye correction in an electronic device comprising an image processor, an image sensor, and a storage device, the method comprising:
   the image sensor capturing image data;
   the image processor detecting abnormally-colored regions in the image data;
   the image processor locating a plurality of candidate eye regions according to the abnormally-colored regions;
   a classifier of the image processor verifying at least one eye region of the plurality of candidate eye regions; and
   the image processor recovering an abnormal pupil region of the at least one verified eye region by changing a color of each pixel in the abnormal pupil region to a dark color according to following formulas:

$$Y_{new}=40 \times B(f_p)+Y_{old} \times (1-B(f_p));$$

$$Cb_{new}=Cb_{old} \times (1-B(f_p)); \text{ and}$$

$$Cr_{new}=Cr_{old} \times (1-B(f_p));$$

where $$B(f_p) = \frac{P(f_p \mid y=1)P(y=1)}{P(f_p \mid y=1)P(y=1)+P(f_p \mid y=0)P(y=0)}, f_p$$

is color intensity of the pixel, $P(f_p|y=1)$ is probability of the color intensity equaling $f_p$ when the pixel is abnormally-colored, $P(y=1)$ is probability of the pixel being abnormally-colored, $P(f_p|y=0)$ is probability of the color intensity equaling $f_p$ when the pixel is not abnormally-colored, $P(y=0)$ is probability of the pixel not being abnormally-colored, $Y_{old}$ is Y-component of the color, $Y_{new}$ is Y-component of the dark color, $Cb_{old}$ is Cb-component of the color, $Cb_{new}$ is Cb-component of the dark color, $Cr_{new}$-component of the color, and $Cr_{old}$ is Cr-component of the dark color.

7. The method of claim 6, further comprising:
the image processor rejecting at least one non-eye region of the plurality of candidate eye regions.

8. The method of claim 6, further comprising:
the image processor removing a similar eye region of the at least one verified eye region.

9. The method of claim 6, wherein the image processor detecting the abnormally-colored regions in the image data comprises:
the image processor utilizing a neural network to predict abnormal pixels;
the image processor grouping the abnormal pixels into a plurality of candidate abnormal regions;
the image processor calculating color intensity of each abnormal color in the image;
the image processor selecting abnormally-colored pixels according to an intensity threshold; and
the image processor forming abnormally-colored regions out of relocated pixels of the abnormally-colored pixels.

10. The method of claim 9, further comprising rejecting non-pupil candidate abnormal regions of the plurality of candidate abnormal regions.

11. The method of claim 9, wherein the image processor selecting abnormally-colored pixels according to an intensity threshold is the image processor selecting abnormally-colored pixels having red, blue, or green color intensity greater than 0.5.

* * * * *

UNITED STATES PATENT AND TRADEMARK OFFICE
CERTIFICATE OF CORRECTION

PATENT NO. : 8,581,999 B2  
APPLICATION NO. : 12/980290  
DATED : November 12, 2013  
INVENTOR(S) : Qiaoling Bian et al.

Page 1 of 1

It is certified that error appears in the above-identified patent and that said Letters Patent is hereby corrected as shown below:

On the title page, item (73), correct the residence of the assignee from "Zhejuang Province" to --"Zhejiang Province"--.

Signed and Sealed this
Eleventh Day of February, 2014

Michelle K. Lee
*Deputy Director of the United States Patent and Trademark Office*